No. 707,973. Patented Aug. 26, 1902.
T. H. J. LECKBAND.
CARBURETER.
(Application filed May 29, 1902.)
(No Model.)
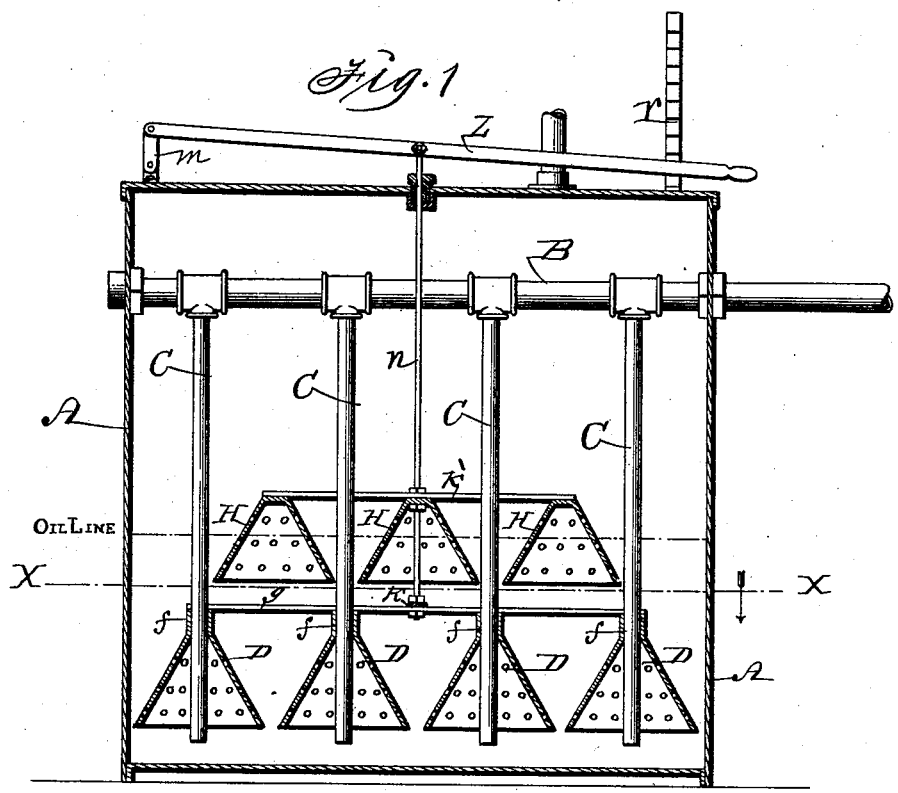
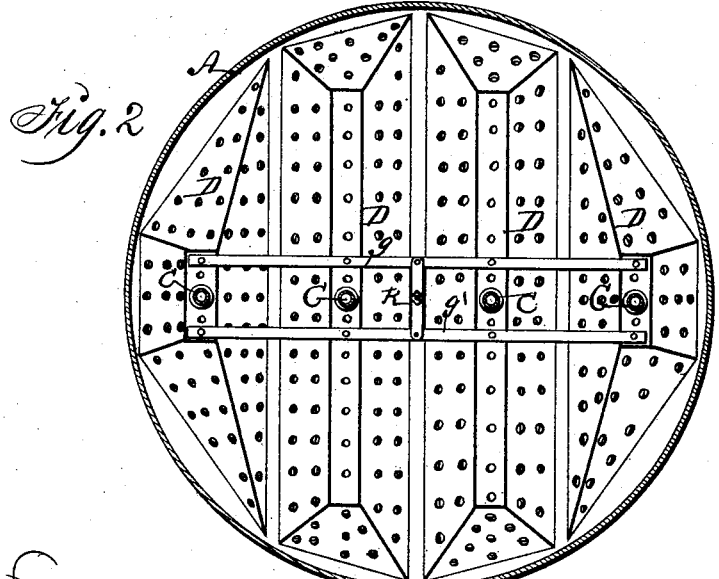
THE NORRIS PETERS CO., PHOTO-LITHO., WASHINGTON, D. C.

UNITED STATES PATENT-OFFICE.

THEODOR H. J. LECKBAND, OF ADAIR, IOWA, ASSIGNOR OF ONE-HALF TO MASON CITY GAS AND FUEL COMPANY, OF MASON CITY, IOWA.

CARBURETER.

SPECIFICATION forming part of Letters Patent No. 707,973, dated August 26, 1902.

Application filed May 29, 1902. Serial No. 109,431. (No model.)

*To all whom it may concern:*

Be it known that I, THEODOR H. J. LECKBAND, a citizen of the United States, residing at Adair, in the county of Adair and State of Iowa, have invented a new and useful Carbureter, of which the following is a specification.

My object is to provide a simple means of regulating the quality of gas produced in a carbureter; and my invention consists in a plurality of air-distributers and means for jointly raising and lowering them when immersed in oil in a tank, as hereinafter set forth, pointed out in my claims, and illustrated in the accompanying drawings, in which—

Figure 1 is a vertical central sectional view of my improved carbureter, that shows the air-distributers adjustably connected with fixed air-distributing tubes and mechanism for raising and lowering the air-distributers. Fig. 2 is a view on the line $x\,x$ of Fig. 1 looking downward upon the air-distributers.

The letter A designates an air-tight tank, that may vary in size as desired. An air-conveying tube B is fixed in the top portion in a horizontal position and a plurality of air-distributing tubes C are fixed to the tube B to extend down near the bottom of the tank and are open at their free ends for discharging air into oil in the tank.

To each tube C is slidingly connected an elongated air-distributer D, that is cone-shaped in cross-section, as shown in Fig. 1, and extends across the inside of the tank, as shown in Fig. 2. The forms of the two parallel central ones and those at their sides differ in shape, as shown and as required to jointly fill the circular interior space of the tank. They are perforated to allow air to filter from their insides outward to ascend through oil upward, as required to volatilize the oil and mingle air and oil to produce gas. Sleeves or tubular extensions $f$ at their tops and centers serve as guides on the tubes C to retain the distributers D in proper positions as they are raised and lowered. They are also rigidly connected by metal straps $g$ and $g'$, fixed across their tops in parallel position, as shown in Fig. 2. A second series of distributers H are fixed on top of the metal straps by means of a cross-bar $k$, fixed thereto, and a metal strap $k'$, fixed across their tops, as shown in Fig. 1, or in any suitable way, so all the distributers D and H can be jointly adjusted relative to the bottom of the tank and oil therein. A lever L is connected to the top of the tank by means of a pivoted fulcrum $m$ and a rod $n$, detachably fixed to the metal cross-bar $k$ and the metal strap $k'$, as shown in Fig. 1, and extended up through a stuffing-box $n'$, fixed in the top and center of the tank and pivotally connected with the lever L in such a manner that all the distributers can be jointly raised and lowered by means of the lever and retained at any point of elevation by means of a rack $r$, fixed on top of the tank to engage the lever, as shown in Fig. 1, or in any suitable way.

In the practical operation of my invention air is discharged from the lower open ends of the tubes C and bubbles up in the oil into the distributers and passes through their perforations and is thus divided minutely in the oil before it rises above the oil, as required to volatilize the oil to produce gas. It is obvious the quality of the gas depends upon the amount of oil or hydrocarbon that is mixed with the air, and it is also obvious that the quantity of oil thus vaporized and mingled with the air can be readily governed by raising and lowering the distributers D, as required, to utilize only the lower series D and only portions of them when it is desired to reduce the richness of the gas or to use all of the distributers D and parts or all of the upper series H for increasing the richness. A simple means of regulating the quality of the gas is thus provided that can be readily and advantageously operated for making gas of the right quality for practical use.

Having thus described the purpose, construction, and operation of my invention, its practical utility will be readily understood by persons familiar with the art to which it pertains, and

What I claim as new, and desire to secure by Letters Patent, is—

1. In a carbureter for gas-machines, an air-tight tank, a fixed tube extending horizontally in the top portion of the tank, a plurality of tubes fixed to the horizontal tube to extend into the lower portion of the tank, elongated air-distributers fixed together and slidingly connected with the lower ends of the fixed tubes, means for raising and lowering the air-distributers and means for retaining them stationary at different points of elevation, arranged and combined to operate in the manner set forth for the purposes stated.

2. In a carbureter for gas-machines, an airtight tank, a tube fixed in the top portion of the tank to extend horizontally, a plurality of tubes extending vertically and fixed to the horizontal tube, an air-distributer slidably connected with each fixed upright tube, means for jointly raising and lowering the distributers relative to the bottom of the tank and a plurality of air-distributers fixed on top of the distributers slidably connected with the upright tubes, to operate in the manner set forth for the purposes stated.

3. A carbureter for gas-machines, an airtight tank, an air-tube fixed in its top portion to extend horizontally, a plurality of tubes fixed to the horizontal tube to extend downward, an air-distributer slidably connected with the lower end portion of each upright tube, a second series of air-distributers fixed on top of the lower distributers, a rod connected with the plurality of distributers and extended up through the top of the tank and the rod pivotally connected with the lever and a rack for retaining the lever in a fixed position, arranged and combined to operate in the manner set forth for the purposes stated.

THEODOR H. J. LECKBAND.

Witnesses:
R. H. ORWIG,
THOMAS G. ORWIG.